United States Patent [19]

Seen et al.

[11] Patent Number: 4,845,756

[45] Date of Patent: Jul. 4, 1989

[54] APPARATUS FOR THROUGH-CONNECTING AUDIO SIGNALS

[75] Inventors: Manfred Seen, Weilheim; Heinz-Peter Kretschmann, Seehausen, both of Fed. Rep. of Germany

[73] Assignee: Siemens Aktiengesellschaft, Berlin and Munich, Fed. Rep. of Germany

[21] Appl. No.: 79,065

[22] Filed: Jul. 29, 1987

[30] Foreign Application Priority Data

Sep. 9, 1986 [DE] Fed. Rep. of Germany ....... 3630678

[51] Int. Cl.$^4$ .............................................. H04B 3/00
[52] U.S. Cl. ........................................ 381/77; 381/81
[58] Field of Search ................. 381/77, 80, 81; 370/6, 370/32

[56] References Cited

U.S. PATENT DOCUMENTS

| 2,142,316 | 1/1939 | Huber | 370/6 |
|---|---|---|---|
| 2,150,451 | 3/1939 | Milnor | 370/6 |
| 2,205,447 | 6/1940 | Wallace et al. | 381/77 |
| 2,489,008 | 11/1949 | Callender | 381/80 |
| 3,217,428 | 11/1965 | Spaulding | 381/77 X |
| 4,337,480 | 6/1982 | Bourassin et al. | |

FOREIGN PATENT DOCUMENTS

| 0130036 | 1/1985 | European Pat. Off. . |
|---|---|---|
| 0172928 | 3/1986 | European Pat. Off. . |
| 2622697 | 11/1977 | Fed. Rep. of Germany . |
| 8400115 | 1/1985 | Netherlands . |

Primary Examiner—Ulysses Weldon

[57] ABSTRACT

Apparatus for through-connecting audio signals between a broadband network and audio sources, as well as audio sinks, comprises a plurality of audio sources which are connectible to an audio source bus having stereo capability by way of source matching assemblies and a plurality of audio sinks which are connectible to an audio sink bus having stereo capability via sink matching assemblies, and a transfer and mixing assembly by way of which the audio source bus is connected to an audio transmission bus of the broadband network and the audio sink bus can be connected to an audio receiving bus of the broadband network or to the audio transmission bus.

5 Claims, 3 Drawing Sheets

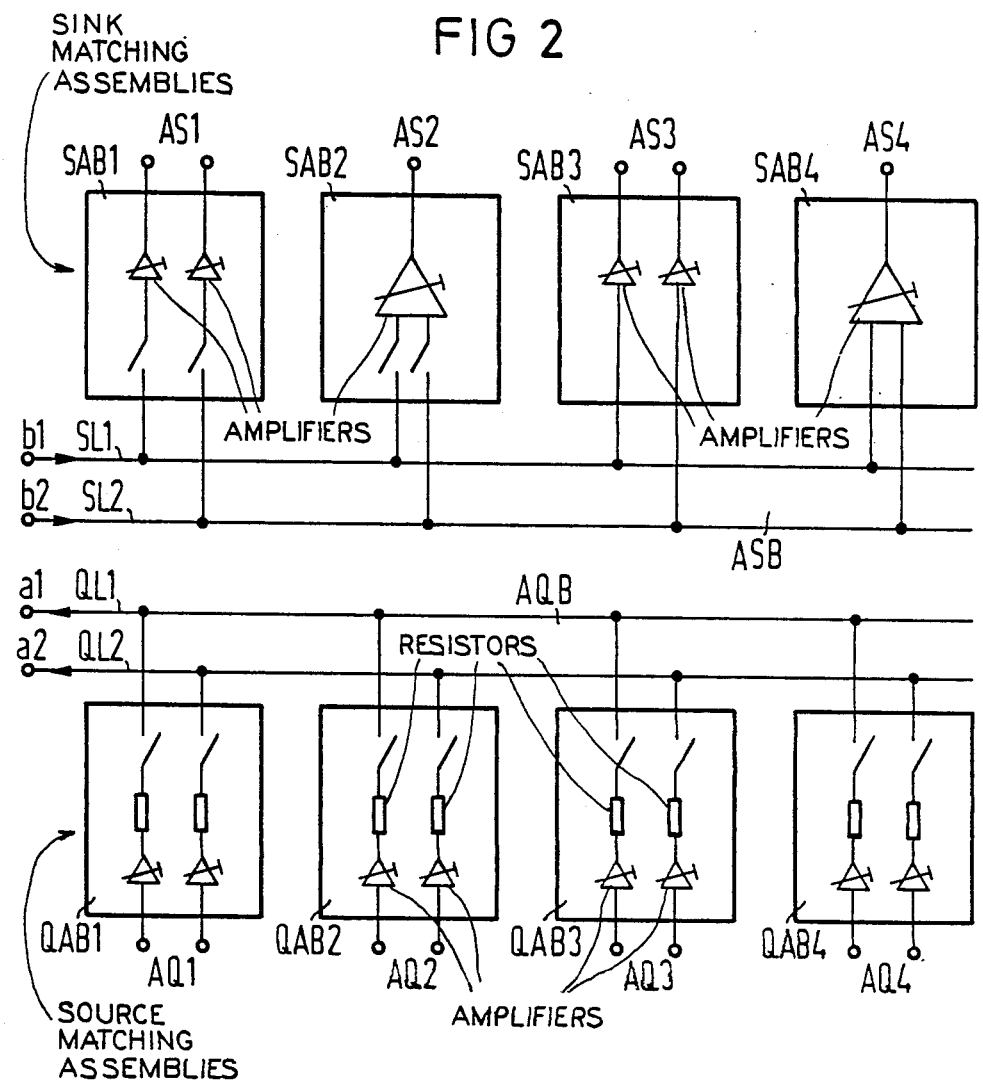

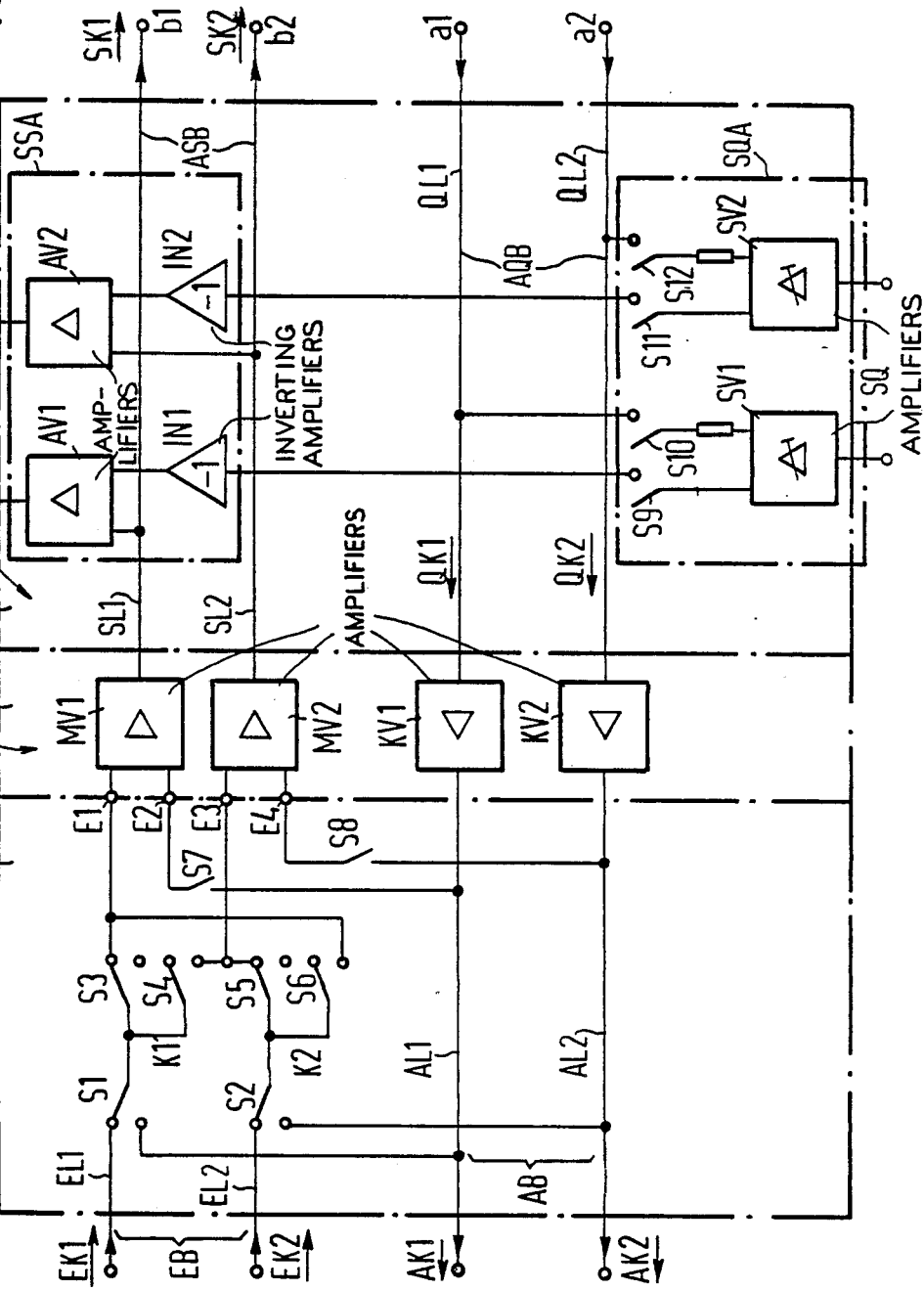

APPARATUS FOR THROUGH-CONNECTING AUDIO SIGNALS

BACKGROUND OF THE INVENTION

1. Field of the Invention

The present invention is directed to apparatus for through-connecting audio signals between a broadband network and audio sources and audio sinks.

2. Description of the Prior Art

Different audio sources and audio sinks should be connected to a broadband network. Examples of audio sources are microphones, record players or a radio tuner; examples of audio sinks are tape recorder devices or loudspeakers. The audio sources should be capable of being connected to a broadband network not only by way of a transmission bus, via a switching facility, but should also be capable of being connected to the audio sinks of a subscriber. Of course, the audio sinks can also be connected to the broadband network via an audio receiving bus. For example, the audio portion of a television program is transmitted via a broadband network. Of course, it is possible to produce arbitrary connections between audio sources and audio sinks with the assistance of a switching matrix network and also connect these to the broadband network. Such a switching matrix network, however, would be extremely complicated.

SUMMARY OF THE INVENTION

The object of the present invention is to provide an apparatus for through-connecting audio signals with a low circuit expense.

The above object is achieved, according to the present invention, in a system of the type generally set forth above which is particularly characterized in that a plurality of audio sources are connectible to an audio source bus having stereo capabilities via source matching assemblies, in that a plurality of audio sinks are connectible to an audio sink bus also having stereo capabilities via sink matching assemblies, and in that a transfer and mixing assembly is provided over which the audio source bus is connected to an audio transmission bus of the broadband network and by way of which the audio sink bus can be connected to an audio receiving bus of the broadband network or to the audio transmission bus.

It is particularly advantageous that the utilization of bus systems only requires a low circuit expense and that a simple structure capable of expansion at any time can be realized. It is thereby always possible to connect the greatest variety of audio sources and audio sinks to an audio source bus or, respectively, audio sink bus with the assistance of different source matching assemblies. Combining stereo channels to form a monochannel is likewise possible.

By way of a mixer device, the signals of the audio source bus can be mixed with the signals of the receiving bus and be connected onto the audio sink bus.

A voice connection device enables the connection of a voice source onto the audio source bus. The signals of this voice source can again be subtracted in a voice sink matching assembly, so that no feedback occurs.

The audio sources are switched onto the audio source bus vis switches as needed. The sink matching assemblies are permanently connected to the audio sink bus, as needed, or can likewise be connected via switches.

A level matching is advantageously provided in all interface connection assemblies. In order to also be able to switch a plurality of audio sources to the audio source bus simultaneously, the outputs of the source matching assemblies are executed in relatively high-impedance fashion and channel amplifiers at whose inputs the sum signals are formed are inserted between the audio source bus and the audio transmission bus connected to the broadband network.

It is also advantageous that the device for through-connecting audio signals for fundamentally corresponds in terms of realization with a device for through-connecting video signals, so that the audio signals belonging to the video signals can be correspondingly through-connected, whereby the expense for the control remains low.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 2 is a schematic diagram of a transfer and mixer assembly; and

FIG. 3 is a schematic circuit diagram of an audio bus system.

DESCRIPTION OF THE PREFERRED EMBODIMENTS

Figure 1:
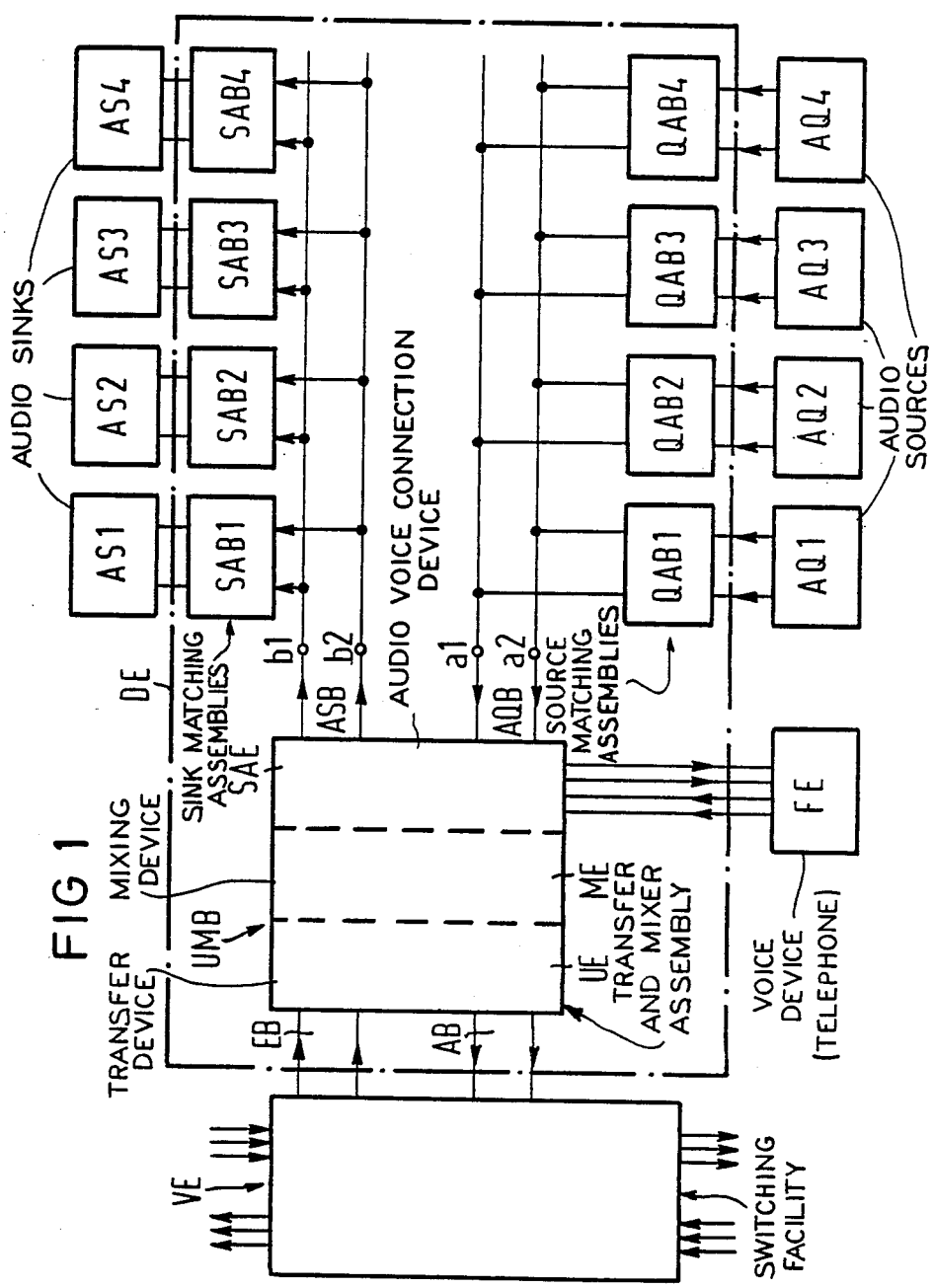
FIG. 1 is a basic circuit diagram of the apparatus for through-connecting audio signals.

Referring to FIG. 1, the apparatus DE for through-connecting audio signals essentially comprises a transfer and mixer assembly UMB which is connected to a switching facility VE of a broadband network via an audio transmission bus AB and an audio receiving bus EB. The transfer and mixing assembly is also connected to an audio source bus AQB and to an audio sink bus ASB to which the apparatus of the subscribers are connected. Audio sources AQ1-AQ4 are connected to the audio source bus via source matching assemblies QAB-1-QAB4. Likewise, audio sinks AS1-AS4 are connected to the audio source bus via matching assemblies QAB1-QAB4. Likewise, audio sinks AS1-AS4 are connected to the audio sink bus ASB via sink matching assemblies SAB1-SAB4. The transfer and mixer assembly UMB comprises a transfer device UE, a mixing device ME and, in this exemplary embodiment, also comprises a voice connection device SAE. A voice device FE (telephone device) is connected to the latter.

The transfer device UE allows all meaningful connections between the buses to be completed. The mixer device ME not only allows the mixing of various audio sources of the subscriber, but additionally allows the mixing of audio signals connected to the audio source bus with signals transmitted via the audio receiving bus. A great number of audio sources or, respectively, audio sinks can be connected to the audio buses AQB and ASB. This exemplary embodiment of the invention is limited to bus systems each comprising two bus lines. Of course, bus systems comprising more lines can also be employed, whereby the plurality of simultaneously possible, individual connections between audio sources and audio sinks is increased. In by far the most instances, audio buses with stereo capability, each comprising two bus lines, should be adequate. The utilization of audio buses having more than four bus lines each (two full stereo channels) does not seem advantageous.

The voice connection device SAE allows the connection of a voice source of the voice device FE without having the voice signals applied back to the voice device FE.

The audio source bus and the audio sink bus, as well as the matching assemblies, are shown in greater detail in FIG. 2. The audio source bus AQB comprises a first source bus line QL1 and a second source bus line QL2. The outputs of the source matching assemblies QAB-1–QAB4 are connected to the source bus lines, each of the source matching assemblies comprising two input and two outputs, so that the audio source AQ1–AQ4 having stereo capability can be connected. The gain of the source matching assemblies can be varied for level matching. Of course, a matching to the output impedances of the audio sources is also possible. The respectively desired audio source is connected to the audio source bus via switches (mechanical/electronic).

However, the signals of a plurality of audio sources can also be mixed. The sink matching assemblies SAB-1–SAB4 are correspondingly connected to the sink bus lines SL1 and SL2 of the audio sink bus; the gains and, if necessary, the output impedances are likewise adjustable. The sink matching assemblies SAB1 and SAB2 can thereby be separated from the sink bus lines via switches, whereas the sink matching assemblies SAB3 and SAB4, by contrast, are always connected in a dedicated manner. Addition amplifiers which serve the purpose of converting a stereo signal into a monosignal are provided in the sink matching assemblies SAB2 and SAB4.

The transfer and mixing assembly UMB is shown in detail in FIG. 3. The circuit points a1, a2 and b1, b2 are connected to the identically-referenced circuit points of FIG. 2. The real audio source bus AQB is connected to the corresponding transmission bus lines AL1, AL2 of the audio transmission bus AB by way of two channel amplifiers KV1 and KV2 of the mixer device ME. The transfer device UE is also connected to the switching device VE of the broadband network via the audio receiving bus EB. The audio receiving bus comprises two receiving bus lines EL1 and EL2. The transfer device UE essentially contains two switch sets S1, S3, S4 and S2, S5, S6 which respectively allow each of the transmission bus lines AL1, AL2 and receiving bus EL1, EL2 to be connected to each or both of the audio sink lines SL1 and SL2.

In order to facilitate the description of the operation, the lines of the buses have audio channels assigned thereto which are referenced in accordance with the first or second source channels QK1 and QK2; sink channel SK1, SK2; the transmission channels and AK1, AK2; and the receiving channels EK1 and EK2.

With the assistance of two additional switches S7 and S8, it is also possible to mix the source channels QK1 and QK2 with the signals on the receiving bus lines EL1 and EL2. This occurs with the assistance of two mixer amplifiers MV1 and MV2 of the mixer device ME. The first inputs E1 or, respectively, E3 of the mixer amplifiers are thereby respectively connected via the switch sets S1, S3, S4 and S2, S5, S6 to the input bus lines EL1 and EL2 and the second inputs E2, E4 are connected to the output lines AL1 and AL2 via the further switches. The sink bus lines SL1 and SL2 are connected to the outputs of the mixer amplifiers MV1 and MV2.

A few further switching possibilities of the transfer device UE shall be set forth in greater detail below. The through-connection of the receiving channels EK1 and EK2 via the switches S1, S3 or, respectively, S2, S5 onto the audio sink bus ASB can be considered as the standard case. The source channels QK1 and QK2 can therefore be mixed in via the further switches S7, S8. Likewise, the receiving bus can be disconnected and the transmission channels AK1, AK2 can be connected to the audio sink bus ASB.

However, a receiving channel, for example the channel EK1, can also be connected onto sink bus lines SL1, SL2 (mono circuit) via the switches S1, S3 and S2, S4.

The transfer and mixer assembly UMB also has a voice connection device SAE assigned thereto wherein a voice source SQ is connected by way of a voice source connector SQA. The voice source connector SQA comprises voice amplifiers SV1, SV2 for each voice channel. Each amplifier comprises two outputs of which the high-impedance, respectively first output can be connected by way of switches S10 or, respectively, S12 to a respective source bus line QL1 or, respectively, QL2. The second output of each voice amplifier is likewise connected by way of a switch S9 or, respectively, S11 to a voice sink matching assembly SSA. The latter comprises two addition amplifiers AV1 and AV2 of which the first input is respectively connected to a sink bus line SL1 or, respectively, SL2. The second input of the first addition amplifier AV1 is connectible to the second output of the first voice amplifier SV1 via a first inverting amplifier IN1. Likewise, the second input of the second addition amplifier AV1 is connectible to the second output of the second voice amplifier SV2 via a second, inverting amplifier IN2.

This circuit arrangement allows the signals of the voice source SQ to be arbitrarily mixed with the signals on the receiving bus or with further signals of the audio sources AQ1, AQ2 . . . and to be switched onto the audio sink bus. However, the signals of the voice source are again subtracted in the voice sink matching assembly SSA, so that these are no longer available at the outputs of the addition amplifiers AV1 and AV2; feedback effects can therefore be avoided. Of course, the inverting amplifiers IN1, IN2 can be omitted when the addition amplifiers are replaced by subtraction amplifiers or when the voice amplifiers comprise inverting, second outputs.

It is self-evident in the case of all amplifiers that input and output impedances should be dimensioned in accordance with the particular application. It is likewise self-evident that open amplifier inputs are grounded at least in terms of AC voltage, so that pick-up of noise voltages is avoided.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. An apparatus for switching audio signals between a broadband network and audio sources and audio sinks, comprising:

a stereo audio source bus adapted to be connected to said audio sources;

source matching adaptors coupled to said audio source bus for connecting said audio sources to said stereo audio source bus;

a stereo audio sink bus adapted to be connected to said audio sinks;

sink matching adaptors coupled to said audio sink bus for connecting said audio sinks to said stereo audio sink bus; and a transfer and mixing assembly for connecting said audiio source bus to an audio transmission bus of said broadband network and said audio sink bus to an audio receiving bus of said broadband network, said transfer and mixing assembly comprising a transfer device including switch sets by which each receiving bus line of said audio receiving bus and each transmission bus line of said audio transmission bus can be connected to each sink bus line of said audio sink bus, said transfer and mixing assembly comprising a mixing device including channel amplifiers between said source bus lines and said transmission lines, said transfer and mixing assembly comprising mixing amplifiers including first inputs connected to terminals of said switch sets of said transfer device, said mixing amplifiers including second inputs connectible to the respective transmission bus lines and additional switches for connecting said second inputs to said respective transmission bus lines, and a respective sink bus line being connected to the outputs of the mixing amplifiers, said transfer and mixing assembly further comprising a voice connection device including a voice source connection module and a voice sink connection module, said voice source connection module comprising two voice amplifiers each of which includes two outputs, one of said outputs being connectible to one of the source bus lines, said voice sink connection module comprising two amplifiers each of which includes a first input respectively connectible to a sink bus line and a second input respectively connectible to the second output of the appertaining voice amplifier, and a plurality of inverting amplifiers each connecting a respective second input of said amplifiers of said voice sink connection module to said second output of said appertaining voice amplifier.

2. The apparatus of claim 1 wherein each of said sink matching adaptors comprises an amplifier with a variable output level, and the amplifier is a stereo-monoconverter amplifier.

3. The apparatus of claim 2, wherein:

the outputs of said source matching adaptors and said inputs of said sink matching adaptors are connectible to said transmission bus lines and said receiving bus lines via switches.

4. The apparatus of claim 3, wherein:

each of said source matching adaptors comprises high-impedance output resistances and channel amplifiers constructed as summing amplifiers.

5. An apparatus for switching audio signals between a broadband network and audio sources and audio sinks, comprising:

a stereo audio source bus adapted to be connected to said audio sources;

source matching adaptors coupled to said audio source bus for connecting said audio sources to said stereo audio source bus;

a stereo audio sink bus adapted to be connected to said audio sinks;

sink matching adaptors coupled to said audio sink bus for connecting said audio sinks to said stereo audio sink bus; and a transfer and mixing assembly for connecting said audio source bus to an audio transmission bus of said broadband network and said audio sink bus to an audio receiving bus of said broadband network, said transfer and mixing assembly comprising a transfer device including switch sets by which each receiving bus line of said audio receiving bus and each transmission bus line of said audio transmission bus can be connected to each sink bus line of said audio sink bus, said transfer and mixing assembly comprising a mixing device including channel amplifiers between said source bus lines and said transmission lines, said transfer and mixing assembly further comprising mixing amplifiers including first inputs connected to terminals of said switch sets of said transfer device, said mixing amplifiers including second inputs connectible to the respective transmission bus lines and additional switches for connecting said second inputs to said respective transmission bus lines, and a respective sink bus line being connected to the outputs of the mixing amplifiers.

* * * * *